United States Patent [19]
Cook et al.

[11] 3,834,752

[45] Sept. 10, 1974

[54] VEHICLE SPACE CLOSING MEANS

[76] Inventors: Neal A. Cook, 4449 N. Maryland Ave.; Gerard Friedenfeld, 4215 N. Prospect Ave., both of Milwaukee, Wis. 53211

[22] Filed: Jan. 18, 1973

[21] Appl. No.: 324,787

[52] U.S. Cl.................. 296/1 S, 105/2 R, 180/64 A
[51] Int. Cl............................................. B62d 35/00
[58] Field of Search............ 296/1 S, 1 R; 280/403; 105/2 R, 8, 9, 11; 15/246; 180/89 R, 14 R, 64 A

[56] References Cited
UNITED STATES PATENTS

| 529,012 | 11/1894 | Bancroft | 105/11 |
| 2,101,793 | 12/1937 | Field | 296/1 R |
| 2,193,156 | 3/1940 | Antoine | 280/403 |
| 2,737,411 | 3/1956 | Potter | 296/1 S |

FOREIGN PATENTS OR APPLICATIONS

| 1,195,617 | 6/1965 | Germany | 280/403 |

OTHER PUBLICATIONS
Wind Tunnel Tests in "Commercial Car Journal" April, 1955; pages 80 and 210.

*Primary Examiner*—David Schonberg
*Assistant Examiner*—John A. Pekar
*Attorney, Agent, or Firm*—Emerson B. Donnell

[57] ABSTRACT

This disclosure relates to large motor trucks commonly known as semi-trailers and to an arrangement for closing or filling in the rather substantial space which necessarily exists between the tractor cab and the trailer body, as well as the space between two trailer bodies in the case of tandem trailers or "double-bottoms," as known in the trade. Closing in of such spaces has been shown in wind tunnel tests to effect a reduction in power necessary at high speeds substantially in excess of that which can be accomplished by smoothing or streamlining other parts of the combination. It is contemplated that the closing means may be in the form of a flexible enclosure or bag-like member which may be inflated by the exhaust gas from the tractor engine, in which case the bag would act as an effective silencer for the exhaust noise, although other means for inflating the bag may be utilized, or the bag may be used without inflation, within the scope of the invention.

8 Claims, 6 Drawing Figures

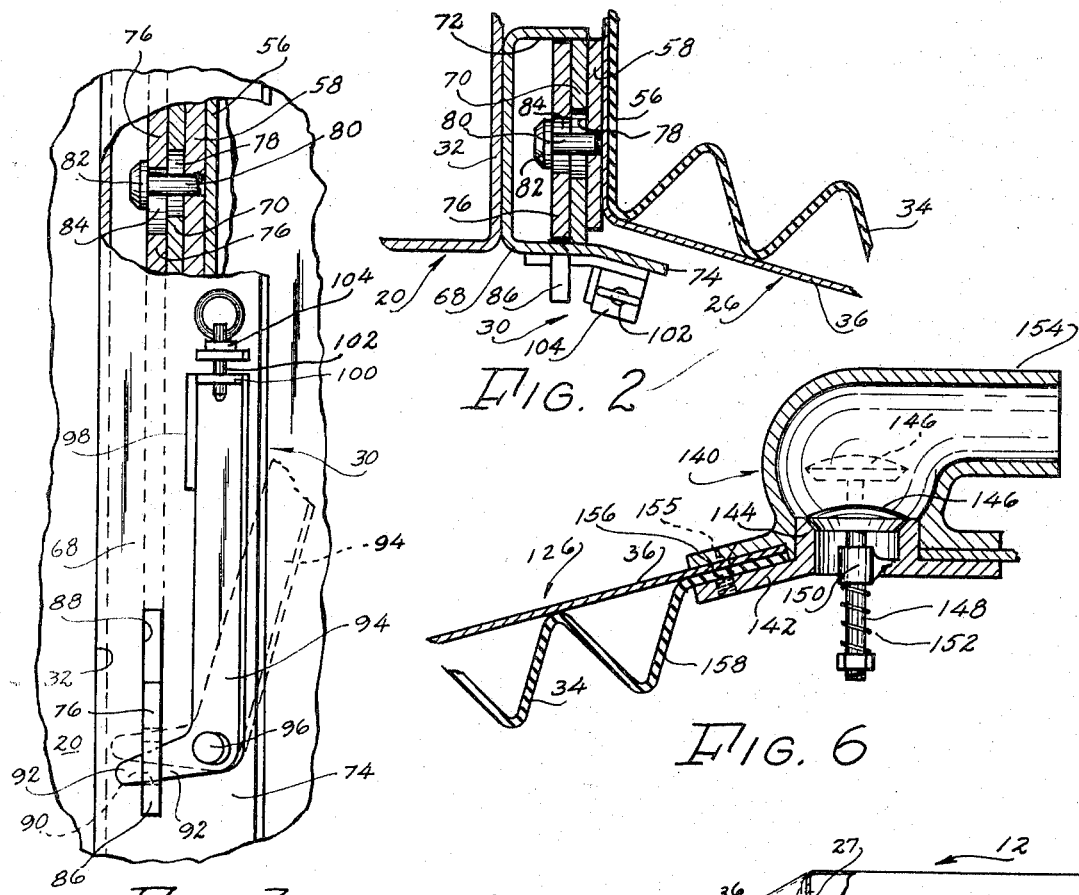
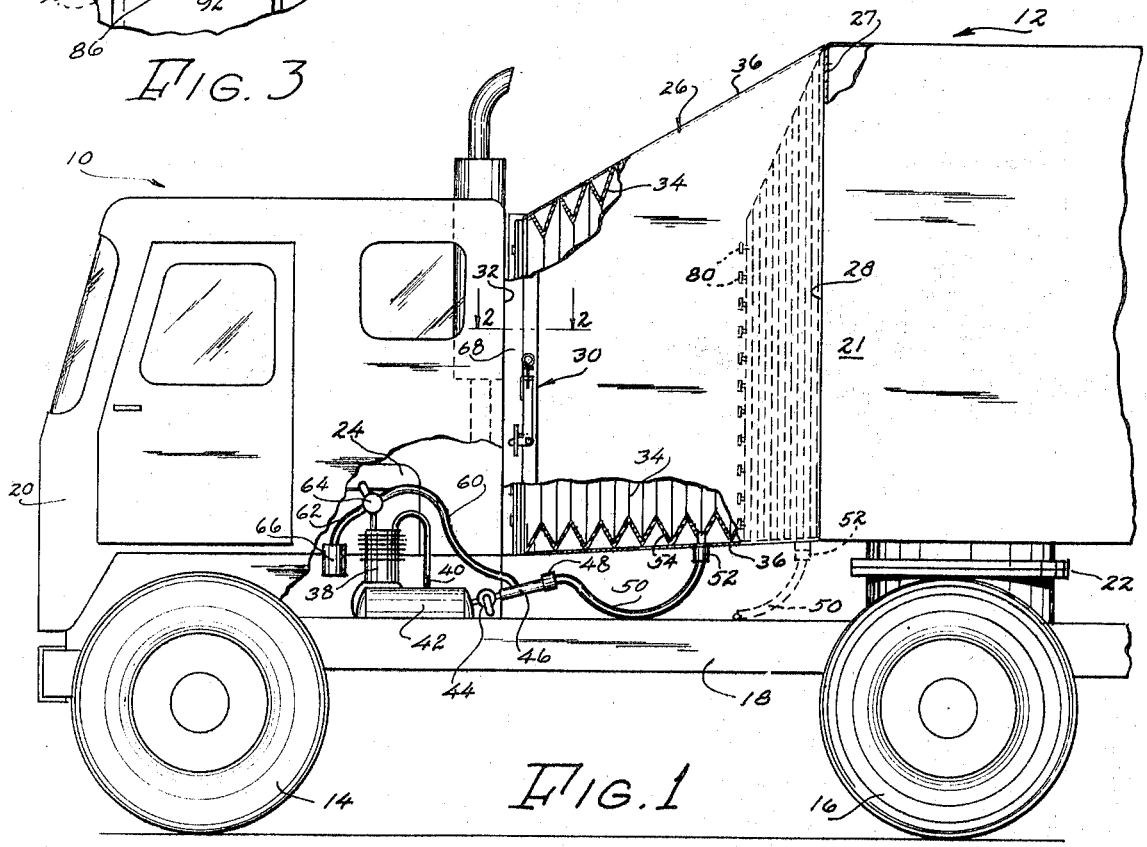

3,834,752

VEHICLE SPACE CLOSING MEANS

Since long distance trucks have taken to running at the speeds of passenger cars, it has become increasingly apparent that windage, or drag of the air through which the truck passes, absorbs a large fraction of the engine power and thereby adds to the cost of operation. However, making the truck body in a streamlined form reduces the loading space to such an extent as to cost more in loss of revenue than the fuel which would be saved. On the other hand addition of an extraneous fish tail to the existing body would be sure to increase the length of the rig beyond that allowed by the highway regulations. However a practical means of enclosing the space between the tractor cab and the front of the trailer body will effect greater economy than streamlining any other portion of the combination, and a principle object of the invention is to provide such a means.

A further object is to provide a closing means which is readily detachable to avoid interference with extreme maneuvering of the truck.

A further object is to provide for inflating the member so that heavy construction will not be required; to provide for prompt collapse of the device when desired, and also to provide a device which, while acting in its streamlining capacity will also act as a silencer for the exhaust noise of the truck engine and as a means for removing polluting material from such exhaust.

It is also an object to provide for removing such polluting material from the device.

The manner in which the foregoing objects are accomplished is fully set forth in the following specification and accompanying drawings, in which:

FIG. 1 is a fragmentary side elevation of a semi-trailer truck, showing one version of the device in use.

FIG. 2 is a horizontal sectional view of a detail, taken on the line 2-2 of FIG. 1, enlarged.

FIG. 3 is an enlarged side elevation of a fragment of FIG. 1.

FIG. 6 is an enlarged axial cross section of an exhaust discharge fitting indicated in FIG. 5.

Similar reference characters have been applied to the same parts throughout these drawings and this specification.

Figure 4:
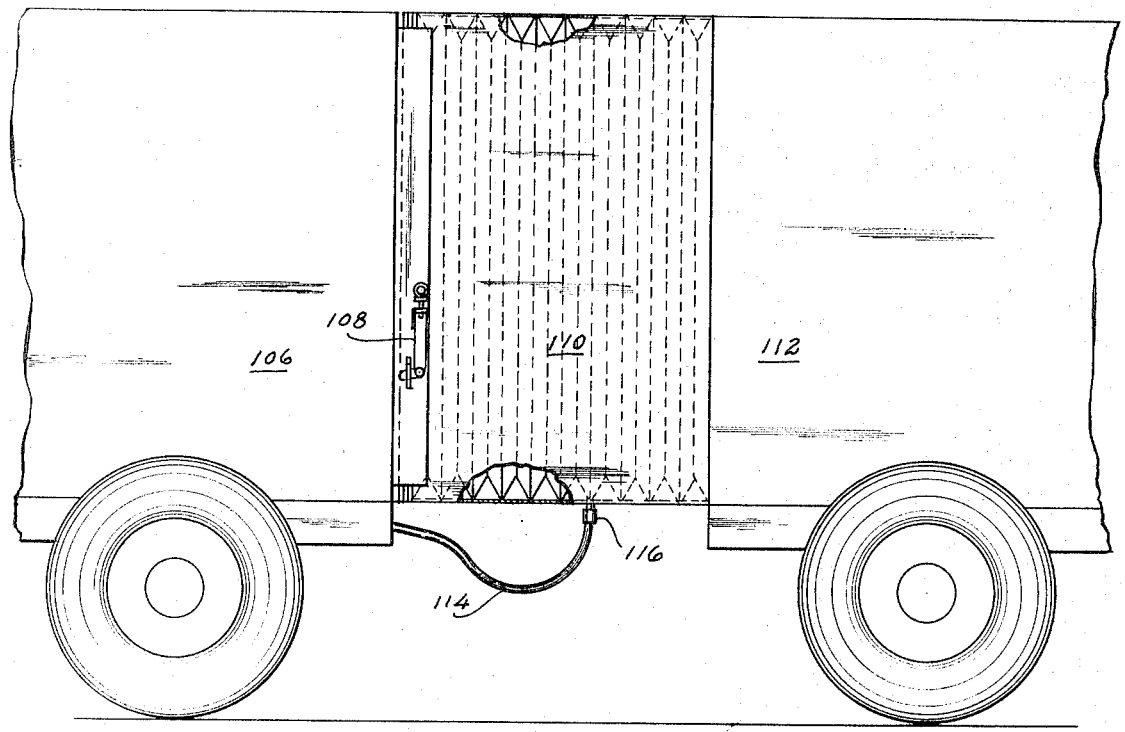
FIG. 4 is a side elevation of the device as applied between two trailer bodies.

As seen in FIG. 1 the device is applied to a semi-trailer truck including a tractor portion 10 and a trailer or body portion 12, the tractor having wheels 14 and 16, a chassis 18 and a cab 20, the body portion 12 having its front end carried on a fifth wheel 22 approximately over the rear wheels of the tractor. The tractor is provided with the usual engine 24 and the other well-known mechanical elements for operation not necessary to describe, as they form no part of the present invention. Since the tractor 10 must swivel in relation to the body 12 it is necessary to provide a substantial space between the cab 20 and the box portion 21 of body 12, and this space gives rise to eddies and turbulence which, at highway speeds, causes excessive aerodynamic drag — in fact in excess of that of any other part of the truck.

In this invention this space is filled in.

A collapsible flexible enclosure or bag-like unit generally designated as 26 is fixed, in this embodiment, on the front wall 27 of the box portion 21 at 28, and, by a detachable latch arrangement generally designated as 30, with the back wall 32 of cab 20, the bag being dimensioned to conform or be congruent with these walls so as to form with the cab and box a substantially continuous surface from the front of the cab backwardly to the sides and top of the box so that there is no large space between these units to cause eddies and drag.

Bag 26 is made of highly flexible rubber-like material 34 preferably corrugated after the manner of a bellows so that it can flex to an extreme degree to follow the changes in the relation between the cab 20 and the box 21, and this corrugated material may be enclosed in a smooth extremely stretchable membrane 36 which covers the corrugations to present a smooth continuous surface to the air flowing past it as the truck proceeds. Material 34 is quite rugged and stable and may maintain its shape against the outside wind pressure developed by the motion of the truck, but to insure such stability it is preferably inflated with gentle pressure from the compressed air supply on the truck commonly provided for operation of the brakes. Thus a compessor 38 is driven in well-known manner from engine 24, and has an outlet pipe 40 leading into a storage tank 42, which it keeps supplied with compressed air in a manner common in the art. A valve 44 controls the flow of air into a pipe 46 to which is attached by means of an air-chuck 48, a hose 50. Hose 50 is connected by means of an air-chuck 52 with a suitable fitting supported in the lower wall 54 of bag 26. Thus with hose 50 in place as described, bag 26 may be inflated to any degree desired by proper manipulation of valve 44.

Bag 26 preferably has a front wall 56 stretched on a frame 58 shaped to correspond substantially with the margins of the rear wall 32 of cab 20 so that it will remain fluid-tight when removed from cab 20, and so that it will be supported at all times in shape to be substantially congruent with said wall 32.

In this embodiment bag 26 is fixed in fluid-tight manner to front wall 27 of box portion 21, and hereinbefore mentioned latch arrangement 30 provides a means for quickly detaching bag 26 from cab 20 when it is desired to remove the tractor from the trailer as is common. When this is to be done hose 50 is readily removed at chuck 52.

Means is provided for conveniently collapsing bag 26 before tractor 10 is removed so as to reduce the projection of the bag from the front of the trailer when it is parked at a loading dock or otherwise. For this purpose a pipe 60 leads from hereinbefore mentioned pipe 46 to the intake pipe 62 of compressor 38, being connected thereto by a valve 64, valve 64 in one position connecting intake pipe 62 with an air cleaner 66, and in another position connecting pipe 60 with intake pipe 62. In this way the suction of compressor 38 is utilized to exhaust bag 26 and cause it to collapse to a minimum dimension as indicated in broken lines in FIG. 1.

Latch 30, as best seen in FIGS. 2 and 3 in the present embodiment comprises a rearwardly open upwardly directed channel member 68 fixed on rear wall 32 of cab 20 substantially at one side edge thereof. A plate 70 is securely fixed in channel 68 to form therewith a box section, one flange 72 of channel 68 terminating substantially flush with plate 70 and the other or outer flange 74 extending rearwardly of plate 70 a short distance and being inclined outwardly to act as a guide for frame 58 when the bag is to be coupled to the cab. A movable plate 76 is guided for up-and-down movement in channel 68 against stationary plate 70. Plate 70 is provided with a plurality of holes 78 spaced to correspond with a like plurality of studs 80 fixed on frame 58 (see also FIG. 1) having heads 82 of a size to pass readily through holes 78 as plate 70 and frame 58 approach each other in the act of coupling the tractor to the trailer. Plate 76 is provided with holes 84 which in one position register with holes 78, but in another position — in the present embodiment lowered — are offset from holes 78 so as to have portions engaged behind heads 82 as indicated in FIG. 3 to lock frame 58 securely against plate 70, or in other words to lock frame 58 onto the back of cab 20. Movable plate 76 has actuating means including a tongue 86 projecting outwardly through a slot 88 in flange 74 and provided with an opening 90 in which is engaged a finger 92 forming part of a release lever generally designated as 94 pivoted on a fulcrum 96 supported on flange 74. Lever 94 has a hand grip portion 98 and a locking flange 100 providing a suitable opening for receiving a locking pin 102 slidable in a bracket 104 fixed on flange 74. It is to be understood that an equivalent structure is also installed on the right side of cab 20.

With pin 102 withdrawn upwardly lever 94 may be rocked toward the dotted position in FIG. 3 whereupon tongue 86 and therefore plate 76 will be raised, causing holes 84 to move into registration with holes 78 so that heads 82 may pass through and release studs 80 and frame 58 from plate 70. Tractor 10 may then be uncoupled and driven away, but first, if desired, valve 64 may be actuated to cause compressor 38 to exhaust bag 26 and cause it to collapse to the approximate position shown in broken lines in FIG. 1. It must not be forgotten to uncouple hose 50.

It is contemplated that an analogous structure may be interposed between the two trailers of a so-called double bottom as seen in FIG. 4. Here the forward trailer body or box 106 has a latch arrangement 108 similar in all respects to hereinbefore described latch arrangement 30 and which secures a bag portion 110 fixed on a box portion 112 of a second trailer, to box portion 106. A pipe 114 is connected to bag member 110 through a chuck 116, and which serves to inflate or collapse bag 110 in the manner fully described in connection with bag 26. Bag portion 110 is preferably similar to bag portion 26 but dimensioned to approximately fit the contours of box portions 106 and 112.

The principles hereinbefore explained can be used in other ways with certain unexpected advantages, as will now be explained.

Figure 5:
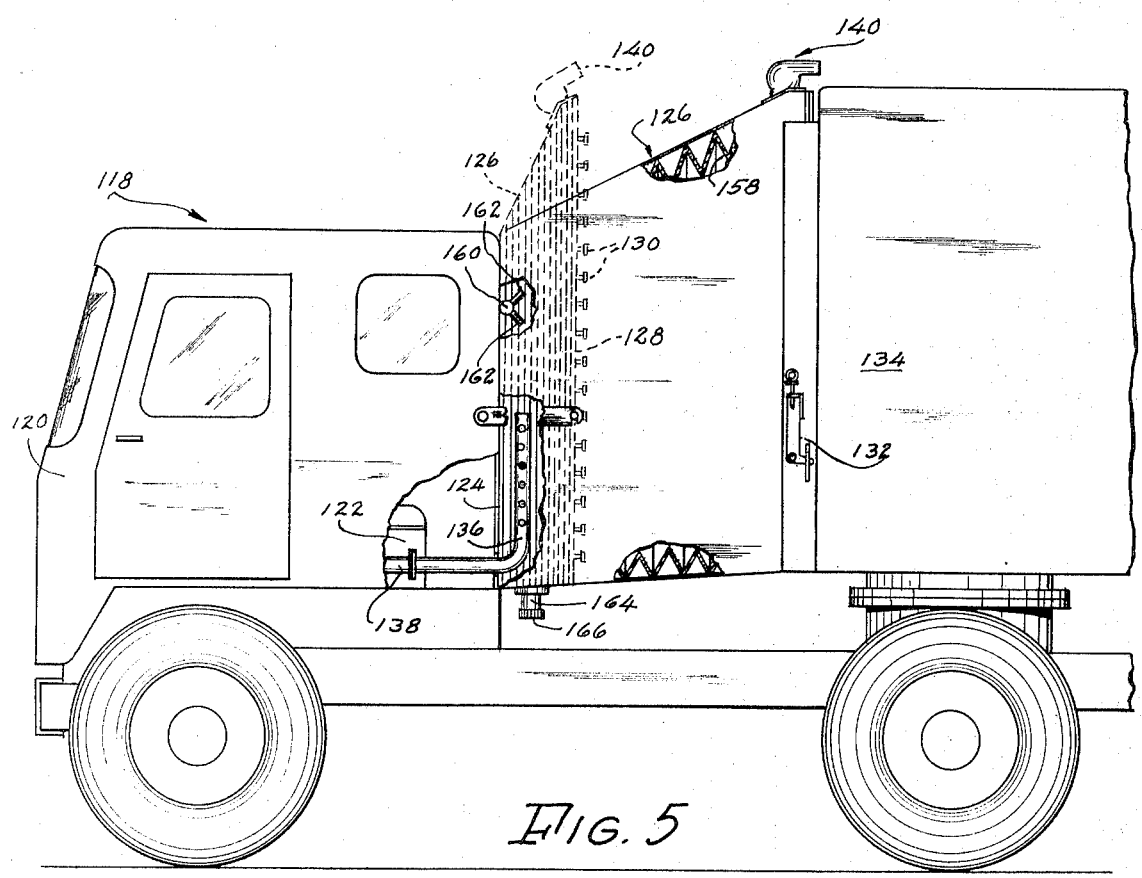
FIG. 5 is a side elevation similar to FIG. 1 of a modified application of the device.

Referring to FIGS. 5 and 6, a tractor 118 has a cab portion 120 and a propelling engine 122 and a rear wall 124, and fixed to the rear wall is a bag member 126 similar in construction to hereinbefore described bag member 26. Hwever, in this case bag member 126 is permanently fixed to wall 124 and has a frame 128 fixed to its rear end and having a plurality of spaced studs 130 which may be engaged with a latch mechanism 132, preferably the same in principle as latch mechanism 30, but mounted on the front of a box portion 134 of a trailer body. When bag portion 126 is extended as shown, it will be engaged with box portion 134 and will enclose the space between it and cab 120, as in the case of the FIG. 1 embodiment.

In this arrangement bag 126 is inflated by the exhaust gas from engine 122 and serves also to reduce or silence the exhaust noise. An exhaust pipe 136 extends from an exhaust manifold 138 through wall 124 into the space within bag portion 126 so as to discharge the exhaust gasses within the bag. If desired the pipe may be extended for some distance within bag 126 and perforated to diffuse the gasses. Running of engine 122 will then produce enough gas to distend bag 126 so that it can be latched to box 134, it being understood that bag 126 will be made of material which will withstand the heat discharged with the exhaust gas and any detrimental material carried by the exhaust. It will be necessary to vent the gasses from bag 126 while maintaining a gentle pressure to keep the bag extended.

A back-pressure valve generally designated as 140, FIG. 6 is provided for this purpose, and which in the present embodiment comprises a base flange unit 142 providing an upwardly directed valve seat portion 144 on which is seated a valve disk 146 having a stem 148 slidable in a guide 150 and engaged by a light spring 152 so that valve 146 will be lifted toward the dotted position when sufficient pressure has been developed within bag 126. A rearwardly directed discharge casing 154 is secured over valve 146 and fixed to base 142 by means of screws 155 engaged in a flange 156, flange 156 and base 142 securing between them some of the fabric 158 of bag 126 so that valve 140 is thereby supported by and maintained in fluid-tight relation to bag 126.

It will be apparent that a quantity of soot, and probably other debris will collect within bag 126 and this may be readily disposed of at any convenient service area by connecting a source of fluid pressure, for example a water hose, to a manifold 160, FIG. 5, disposed transversely across the back of wall 124 within bag 126. Manifold 160 has a plurality of nozzles 162 directed toward strategic areas within bag 126 so that the interior of bag 126 will be thoroughly washed when this is done. The accumulated dirt and fluid will be discarged through a sump fitting 164 having a removable fluid-tight cap 166.

The operation of the invention is thought to be apparent from the foregoing, sufficient to say that the bag element common to the several embodiments will fit relatively smoothly between a leading vehicle or section of a vehicle and a following one and enclose the space, thus eliminating a relatively large irregularity in the contour of the combination and a serious source of aerodynamic drag, which has been tolerated up to now owing to the lack of a solution which was practical and acceptable.

The device may be inflated by the air supply already on the vehicle for another purpose and it can be promptly collapsed at such times as it might encumber the rig in extreme maneuvers. The gentle pressure will tend to keep the tractor of a semitrailer in line with the trailer portion and reduce the tendency to "jacknife" which sometimes occurs under unfavorable conditions.

It may also be inflated by exhaust gas from the vehicle engine, in which case the large volume of the bag member will act as a silencer of the exhaust noise, and as a settling chamber for any solid components in the exhaust, which will be trapped to be discharged somewhere that they will not be objectionable.

Variations, modifications and improvements of the device are contemplated, and it is anticipated that others working in this field may make variations and modifications on the disclosed device, and it is to be understood that all such variations, modifications and improvements are to be considered as part of the invention, insofar as they are covered by the following claims.

What is claimed as new and desired to be secured by letters patent of the United States is:

1. For use in combination with spaced coupled vehicle units one of said units having a back wall, and a trailer including a box portion having a front wall spaced backwardly from said back wall, fairing means enclosing the space between said back wall and said box portion comprising a flexible fluid-tight enclosure of such dimensions as to be substantially congruent on one side with said front wall of said box portion, and substantially congruent on the other side with said back wall of the first mentioned unit, said fluid-tight enclosure being fixed to one of said walls; and means to fix said enclosure to the other wall and to release said enclosure from said other wall at will.

2. A device according to claim 1 including means for inflating said flexible fluid-tight enclosure to maintain its shape against aerodynamic pressure imposed on the outside of said enclosure.

3. A device according to claim 2, one of said vehicle units having a propelling engine provided with an exhaust conduit, said conduit leading into said fluid-tight enclosure for inflating said fluid-tight enclosure with exhaust fluid from said exhaust conduit, and means for venting exhaust fluid from said fluid-tight enclosure.

4. A device according to claim 3 in which said venting means is constituted to restrict the flow of exhaust fluid so as to maintain a positive pressure within said fluid-tight enclosure.

5. A device according to claim 3 including means installed in said fluid-tight enclosure constituted to direct a cleaning fluid onto interior surfaces of said fluid-tight enclosure, a sump supported in position for collecting said cleaning fluid, said sump having a drain, and means for closing said drain to provide for retaining exhaust fluid within said fluid-tight enclosure.

6. A device according to claim 1, one of said vehicle units having a source of compressed gas, and conduit means extending from said source of compressed gas to said fairing means for inflating said fairing means from said source of compressed gas.

7. A device according to claim 6, in which said source of compressed gas includes a compressor having an inlet and an outlet, and means for connecting said conduit means to said inlet of said compressor at will for rapidly collapsing said fairing means when desired.

8. A device in accordance with claim 1, in which said fluid-tight enclosure is composed of rugged, flexible corrugated bellows material having a smooth stretchable overlying membrane covering the corrugated surface of said fluid-tight enclosure to provide a smooth surface for air flow about said fluid-tight enclosure.

* * * * *